May 3, 1938.  H. GOUDET  2,116,113
VERNIER TUNING CONTROL
Filed Dec. 3, 1935
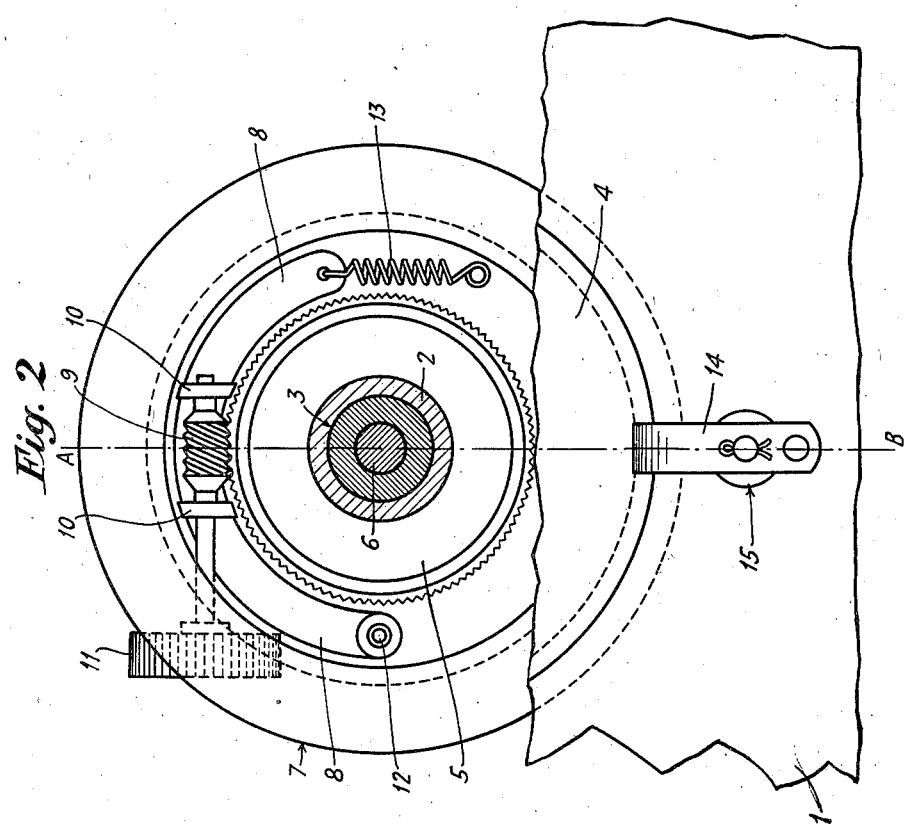
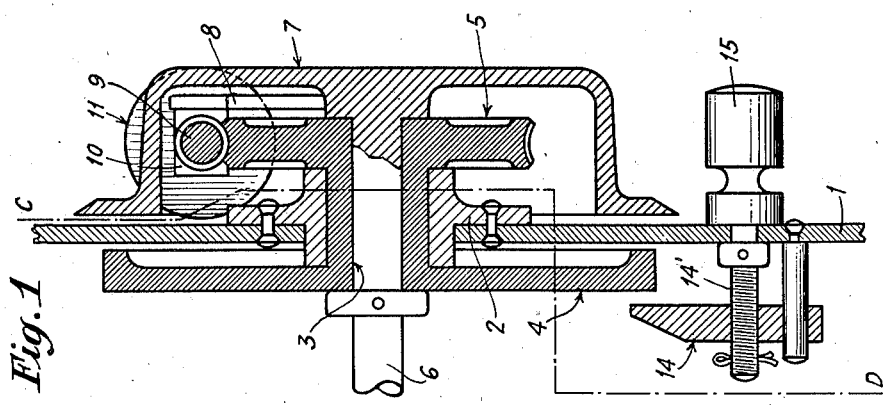
INVENTOR.
H. GOUDET
BY
ATTORNEY.

Patented May 3, 1938

2,116,113

UNITED STATES PATENT OFFICE 2,116,113

VERNIER TUNING CONTROL

Hugues Goudet, Paris, France, assignor to Compagnie Generale de Telegraphie Sans Fil, a corporation of France Application December 3, 1935, Serial No. 52,685
In France January 4, 1935

2 Claims. (Cl. 74—10)

The present invention has for its object to provide a reduction gear system having blocking and play eliminating means and which is particularly applicable to drives for variable condensers, variable inductances, and other similar devices comprising a shaft operated by hand either directly or by means of a reduction gear.

Devices of this type exist in certain numbers, but it was found that in certain cases these devices are insufficient. The use of reduction systems comprising blocking and play eliminating means which are of greater effectiveness, is found to be very important, especially in the case of movable radio apparatus (wireless stations for air craft and for automobiles for instance) which must be easily controllable while en route, and whose control once carried out must not vary under the influence of vibrations and shocks.

In accordance with the invention, such system, besides having an operating knob directly mounted on the movable shaft, has an auxiliary knob, disposed at right angles to and supported by the first knob, said auxiliary knob drives, by means of a non-reversible worm, a disk concentrically arranged about the movable shaft, and susceptible of either turning freely under direct operation by the main knob, or of being rendered immovable by means of a blocking device or reduction drive operated by means of an auxiliary knob. The taking up of play or backlash is then accomplished by a spring device which constantly holds the auxiliary gear against the wheel with which it meshes.

The device will be better understood with reference to the accompanying drawing and the following description of a preferred mode of execution to which the invention is however, not understood to be limited, and which mode of execution is given by way of example only.

Referring to the drawing, Fig. 1 is a sectional view of an embodiment of the invention taken on line A—B of Fig. 2 and, Fig. 2 is a sectional view through the line C—D of Fig. 1.

The panel board 1, which may be any panel of the radio apparatus, has a bearing 2 fixedly secured thereon within which a unit composed of a hollow core 3, a plate 4 and a toothed or worm wheel 5 can freely rotate. In the core 3, the drive shaft 6 of the condenser to be operated, can freely turn, this shaft being formed integral with the principal operating knob 7. In the interior of the knob 7 and moving therewith, there is arranged a unit composed of a piece 8 of the shape of a ring sector supporting a non-reversible worm 9 mounted between two bearings 10, and rotated by an auxiliary knob 11 with suitable knurling on the rim surface, and which protrudes beyond the principal knob 7. This entire assembly is rotatable about the pin or axis 12 mounted on the knob 7, and the worm 9 meshes thereby, without backlash, with the toothed wheel 5, owing to the retraction spring 13. There is furthermore mounted on the panel 1, a clamp 14 with carriage system and screw 14' operated by knob 15 which affords a means for locking the plate 4 with respect to panel 1.

This device functions as follows: When the brake 14 is released, knob 7 can be freely operated; this knob directly moves the tuning shaft 6 and at the same time the unit constituted by the worm wheel, its core and the plate which are joined together, and the knob further turns the section 8 with the worm and the auxiliary knob 11. If, however, by means of the knob 15 and brake 14, the plate 4 has been locked with panel 1, the entire device, as referred to, is immovable due to the fact that the worm 9 is non-reversible and has no play. By subsequently moving the knob 11, the knob 7 will be slowly advanced or turned backwards relative to the wheel 5 which is locked, due to the reduction gear constituted by the assembly of the toothed wheel and worm.

It must be understood that without departing from the spirit of the invention, the device just described with reference to the accompanying figures is susceptible of a great number of variations which can be easily resorted to by anyone skilled in the art.

Having described my invention, what I claim as novel and desire to secure by Letters Patent is:

1. Means for adjusting a control shaft comprising in combination, a handle secured to said shaft, a worm wheel journaled on said shaft, a crescent shaped member having one end pivoted to said handle, a spring connected to said handle and the free end of said member, a worm mounted in said pivoted member and in engagement with said worm wheel, a drive shaft connected to said worm and journaled for rotation in said pivoted member and extending in a direction normal to said control shaft and a knob secured to said drive shaft.

2. Means for setting and holding a tuning control shaft of a radio device, which is mounted in a movable vehicle and subject to the vibrations thereof, at a predetermined fixed position comprising the combination of a panel through which said control shaft extends, a control knob secured to said shaft and having a closed end parallel to said panel and a hollow portion adjacent the front of said panel, a worm wheel located in the hollow portion of said knob concentric with said shaft, a disc connected to said worm wheel and located at the rear of said panel, a shaft extending through said panel adjacent said control knob and having a handle in front of said panel, a clamping device adapted to be moved by said last named shaft into engagement with the outer portion of said disc, a member mounted in the hollow portion of said control knob, a worm mounted for free rotation in said member, a spring device arranged to hold said worm in engagement with said worm wheel, a vernier control shaft connected to said worm and extending through said control knob in a direction substantially normal to said tuning control shaft and a control knob connected to the outer end of said last named shaft.

HUGUES GOUDET.